W. HESS.
STEREOSCOPIC PICTURE.
APPLICATION FILED JUNE 1, 1912.
1,128,979.
Patented Feb. 16, 1915.
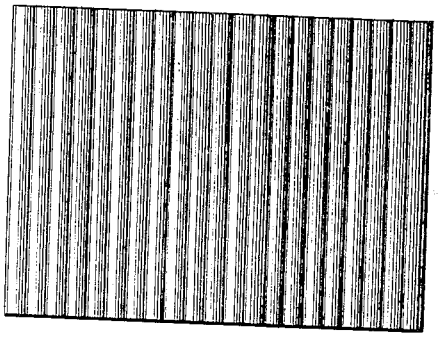
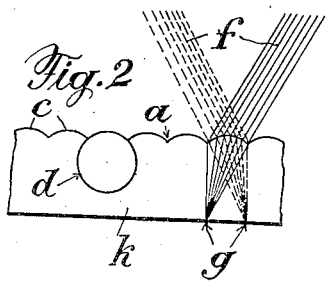
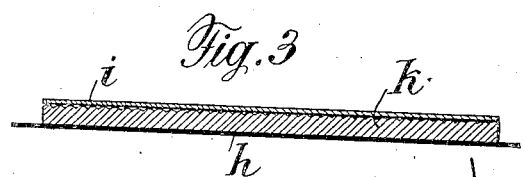
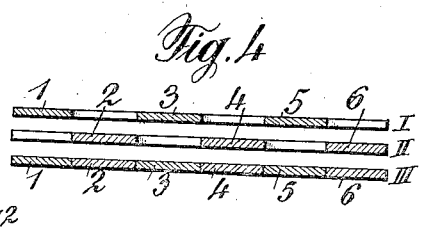
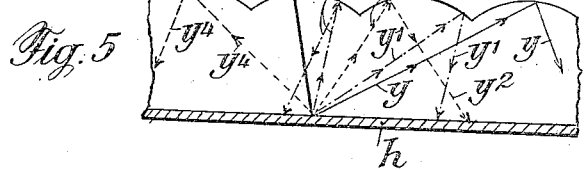
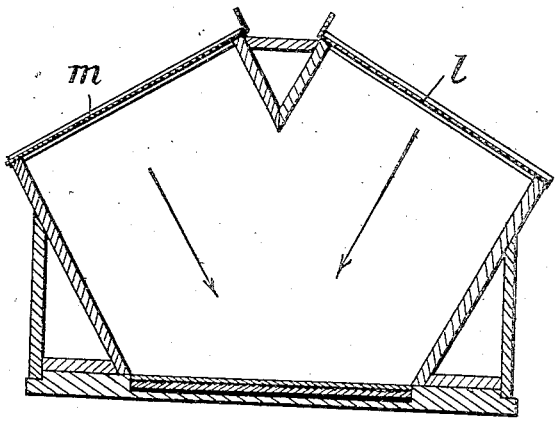

UNITED STATES PATENT OFFICE.

WALTER HESS, OF RAPPERSWIL, SWITZERLAND.

STEREOSCOPIC PICTURE.

1,128,979.  Specification of Letters Patent.  Patented Feb. 16, 1915.

Application filed June 1, 1912. Serial No. 700,949.

*To all whom it may concern:*

Be it known that I, WALTER HESS, a citizen of the Republic of Switzerland, residing at Rapperswil, Switzerland, have invented certain new and useful Improvements in Stereoscopic Pictures; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In order to see images spatially, hitherto two single images located side by side and belonging to a stereoscopic pair of images have been caused to optically cover each other by means of prisms held before the eyes, or two single stereoscopic images printed in complementary colors on each other were viewed through transparent, complementary colored plates, held before the eyes. In both cases an optical expedient to be held before the eyes is necessary. For the same purpose the so called "parallax stereogram" has been proposed, which comprises a double image, composed of fine lines of two single stereoscopic images, wherein the lines of the two single images alternate, and a screen having fine opaque lines which are separated by linear spaces. The opaque lines of the screen cover for each eye all those lines of the image which do not belong to the single stereoscopic image corresponding with that eye. These stereograms can only be used as transparencies, because when looking on the image through the screen with the naked eye the lines of the screen refract light and are mingled with the lines of the image so as to render the latter unclear, moreover, the image located a slight distance below the screen, is shadowed and darkened.

According to the present invention two ordinary stereoscopic negatives are used in making the picture, and there is provided a series of optical light-collecting elements, arranged side by side, which so refract the light that beams, which come from different directions are collected or focused at different places on the sensitized picture surface.

Referring to the drawings, in which like parts are similarly designated—Figure 1 is a plan view on a very much enlarged scale of one form of transparent material through which the picture is printed or viewed. Fig. 2 is an enlarged end view or section of Fig. 1, explaining the action of rays of light from different directions as used by me. Figs. 3 and 4 are diagrammatic views in section, illustrating how a print or picture is made from a negative. Fig. 5 is a diagram illustrating the course of a ray in the operation of printing, and its effect on the print. Fig. 6 is a vertical section showing how the prints are made.

As shown in the drawings, a small transparent plate $k$, or lens surface of celluloid, is provided on its surface $a$ with a large number of small lens elements, here shown as ribs $c$ located side by side. Each rib represents a part of the surface of a cylinder $d$. Parallel beams of light $f$, which enter the plate from the front, are collected and focussed, as a consequence of the cylindrical surface of a single element $c$. The place $q$, or focal point toward which the collection is performed, changes with a change of direction of the entering beams $f$. If a print is made from one of a pair of stereoscopic negatives $i$ placed on top of such a surface composed of such lens elements $c$, the light passes through the negative $i$ and the plate $k$ onto a sensitive layer $h$, (Fig. 3), so that the printing light does not strike the negative from all directions, but from a definite direction only, no light entering from other directions, and a positive print is produced, which does not correspond with the continuous photographic negative, but consists of image portions 1, 3, 5, having intermediate linear spaces, as shown at I, (Fig. 4). The spaces are caused by the absence of printing rays from those directions from which no light was permitted to enter. These linear spaces I use for receiving linear images 2, 4, 6, of a second print II, viz. of the other stereoscopic negative belonging to the same stereoscopic photograph of the same object, in which the rays come from directions which have been free of rays before. The printing light may readily be caused to enter only from distinct directions, for example, by a box (Fig. 6), which is mounted on the printing frame. The box is provided on the top with two windows or blinds $l$, $m$. If the negative with the image for the right eye is inserted in the printing frame, the right window, 1, is opened, in order to permit the printing light to enter. In consequence of the reversibility of the courses of the rays, this image is only to be seen from that side on which the opening or source of light is situated, that is, from the right side. When viewing the image, the right eye is located on this side. In an analogous manner a print is made from the other stereoscopic negative for the left eye, and in this instance the left window is opened, in order to have the light enter from the left side, so that the image on the print can be seen only from the left side, that is to say, by the left eye, when looking on the image in the ordinary manner. The dark places, where no light enters, correspond with the blackened inside walls of the box, which keep the light off from all directions, with the exception of the direction in which the window or blind is situated. The box, therefore, acts as a shutter, which for each of the two stereoscopic images keeps the light off from those directions from which the corresponding image must not be seen. The photographic double-positive III (Fig. 4) is thus completed. When viewed through the same or through congruent elements (Fig. 1) each part of the two prints produced by the single negatives can only be seen from a distinct direction. Corresponding with the linear spaces of each print (I, II), the rays passing outward to the eyes have spaces in distinct directions. Each image is made visible by the optical elements or lens surfaces, as a consequence of their refractive action and visible only in certain directions. Since the prints I, II, used, are two single stereoscopic photographs, both positives of which are on the same surface III, but visible only from different directions, any one looking at the image through the plate $k$ when holding the image in the proper position, sees by the one eye only the image I, and by the other eye only the image II, so that the images are caused to be viewed spatially.

The printing of both negatives need not be performed one after the other, but it may also be done simultaneously, for instance, by the simultaneous projection of the two single images on the same surface from two projector apparatus arranged side by side.

Since when printing the single images the rays of light must be kept off from distinct directions, it is advisable not only to prevent the rays from entering the lens elements from other than said directions, but is also necessary to insure that the rays after entering said elements will not be deflected by reflection toward the linear interspaces, which must be kept free from the other image. This may be done by a light filter. For example, the plate $k$ itself, by coloring its substance, for instance yellow, may act as such filter.

$x$, Fig. 5, designates an entering ray of light. The reflected light $y$, to $y^4$, cannot act directly on the film $h$, but only by returning through the interior of the plate $k$ and being diffused by the surface and reflected to the sensitive layer. The course which these objectionable reflected light rays have to pass within the plate $k$ or filter, is therefore much longer than the single course of the direct ray; the reflected light ray is therefore much more damped, that is, its intensity is greatly diminished by the filter. It is possible to render any of the remaining objectionable light rays, for instance, reflected light rays, inactive by a suitable choice of sensitive layer and hard treatment thereof to produce strong contrasts.

The optical elements arranged side by side, the sensitive layer and also the light filter, if any be used, may be joined in one piece or be wholly or partly separated as well during the production of the immediately acting stereoscopic image, as during the observation of the same.

Instead of a direct photographic print, any equivalent, as a copy produced by impression, may be laid under the optical element.

Thus, the novel product of my novel process or method consists of a picture subdivided by alternating portions of stereoscopic images III, Fig. 4, viewed through a subdivided lens surface $k$ corresponding to the subdivisions of the picture, and preferably connected to or combined with such surface $k$ so that no stereoscope, stereoscopic spectacles or separate light filters are necessary. Each lens element $c$ of the plate $k$ will therefore be common to two adjacent subdivisions of the picture, one subdivision pertaining to one stereoscopic view and the other subdivision to the other stereoscopic view.

I claim—

1. A directly viewable stereoscopic picture composed of subdivided images of stereoscopic pictures whose sections alternate and are adjacent one another, and a lens element surface having adjacent small lens elements, each lens element being common to a section of each stereoscopic picture.

2. A directly viewable stereoscopic picture composed of strip-like subdivisions of two stereoscopic pictures alternating with one another, and a lens element surface having adjacent cylindrical lens elements, each lens element being common to an element of each stereoscopic picture.

3. A directly viewable stereoscopic picture composed of subdivided images of a pair of stereoscopic pictures whose sections alternate and are adjacent one another, and a celluloid covering having a surface of small lens elements, each lens element being common to adjacent sections of the pair of pictures.

4. A directly viewable stereoscopic picture composed of strip-like subdivisions of a pair of stereoscopic pictures, strips of one of said pictures alternating with strips of the other, and a celluloid covering having a surface composed of cylindrical lens elements, each element being common to similar strips of the pair of pictures.

5. A directly viewable stereoscopic picture composed of subdivided images of a pair of stereoscopic pictures whose sections alternate and are adjacent one another, and a covering constituting adjacent lens elements whose curved surfaces are distanced from the composite picture by the thickness of said covering, whereby each lens element will be common to a pair of adjacent image sections.

In testimony that I claim the foregoing as my invention, I have signed my name in presence of two subscribing witnesses.

WALTER HESS.

Witnesses:
 ARNOLD LEHNER,
 HARRY A. McBRIDE.